US010282954B2

(12) United States Patent
Hsiao

(10) Patent No.: US 10,282,954 B2
(45) Date of Patent: May 7, 2019

(54) SINR-BASED INTRUSION DETECTION SYSTEM AND METHOD THEREOF

(71) Applicant: MICROWAVE INFORMATION TECHNOLOGY LTD., Hsinchu (TW)

(72) Inventor: Yu-Ting Hsiao, Hsinchu (TW)

(73) Assignee: MICROWAVE INFORMATION TECHNOLOGY LTD., Hsinchu (TW)

( * ) Notice: Subject to any disclaimer, the term of this patent is extended or adjusted under 35 U.S.C. 154(b) by 0 days.

(21) Appl. No.: 15/655,282

(22) Filed: Jul. 20, 2017

(65) Prior Publication Data

US 2018/0075723 A1 Mar. 15, 2018

(30) Foreign Application Priority Data

Sep. 13, 2016 (TW) .............................. 105129753 A

(51) Int. Cl.
*G08B 13/24* (2006.01)
*H04B 17/336* (2015.01)

(52) U.S. Cl.
CPC ..... *G08B 13/2471* (2013.01); *G08B 13/2474* (2013.01); *G08B 13/2491* (2013.01); *H04B 17/336* (2015.01)

(58) Field of Classification Search
CPC .. H04B 17/309; H04B 17/318; H04B 17/336; H04B 17/345; H04B 17/1027
See application file for complete search history.

(56) References Cited

U.S. PATENT DOCUMENTS

| 5,471,198 | A | * | 11/1995 | Newham | .............. | G08B 13/183 340/556 |
| 7,864,678 | B1 | * | 1/2011 | Sampath | ............... | H04W 28/22 370/232 |
| 2006/0233046 | A1 | * | 10/2006 | Fluhler | ................. | G01S 13/888 367/11 |
| 2010/0289641 | A1 | * | 11/2010 | Kates | ................... | G08B 13/183 340/541 |
| 2013/0130635 | A1 | * | 5/2013 | Kaukovuori | ............. | H04B 1/16 455/226.1 |
| 2013/0162821 | A1 | * | 6/2013 | Park | ................. | G08B 13/19695 348/143 |

(Continued)

OTHER PUBLICATIONS

"Signal-to-interference-plus-noise ratio," Wikipedia, Feb. 16, 2016, accessed at <https://en.wikipedia.org/w/index.php?title=Signal-to-interference-plus-noise_ratio&oldid=704643459>.*

*Primary Examiner* — Laura N Nguyen
(74) *Attorney, Agent, or Firm* — Muncy, Geissler, Olds & Lowe, P.C.

(57) ABSTRACT

A SINR-based intrusion detection system comprises a first antenna, a second antenna, and an arithmetic unit connected to the second antenna. The first antenna simultaneously transmits one or plural beams having mutually different frequencies in an enclosed space so as to cover the enclosed space. The second antenna receives signals of the one or plural beams so as to capture signal parameters of the beam. The arithmetic unit is connected to the second antenna and detects the signal parameters in an always-on manner so as to obtain a SINR value from the signal parameters, comparing the SINR value to a predetermined threshold range, and determining that there is object intrusion when the SINR value falls within the predetermined threshold range.

11 Claims, 6 Drawing Sheets

(56) References Cited

U.S. PATENT DOCUMENTS

| | | | | |
|---|---|---|---|---|
| 2013/0300573 A1* | 11/2013 | Brown | ................. | A61B 5/1113 |
| | | | | 340/870.01 |
| 2014/0099985 A1* | 4/2014 | Sarca | ................... | H04W 48/16 |
| | | | | 455/509 |
| 2014/0307096 A1* | 10/2014 | Park | ................... | G08B 13/1672 |
| | | | | 348/152 |
| 2015/0331100 A1* | 11/2015 | Hsu | ..................... | G01S 7/52004 |
| | | | | 73/598 |
| 2016/0094250 A1* | 3/2016 | Mujtaba | ............... | H04B 7/0808 |
| | | | | 455/552.1 |
| 2016/0112147 A1* | 4/2016 | Seo | ..................... | H04B 17/309 |
| | | | | 375/224 |
| 2017/0138185 A1* | 5/2017 | Saed | ........................ | E21B 47/16 |
| 2018/0012081 A1* | 1/2018 | Hoare | ................ | G06K 9/00791 |

* cited by examiner

SINR-BASED INTRUSION DETECTION SYSTEM AND METHOD THEREOF

BACKGROUND OF THE INVENTION

1. Technical Field

The present invention relates to an intrusion detection system and its method, and more particularly to a SINR-based intrusion detection system and a method thereof.

2. Description of Related Art

Commonly used intrusion detection means include image detection, physical detection, and sensor-based detection. Examples of image detection means are surveillance cameras, infrared surveillance cameras and so on, which capture images that are later algorithmically process by software, thereby determining whether there is human intrusion. Physical detection means may be achieved by providing an area to be monitored with pressure sensors, which, when activated, will be triggered by physical contact from an intrusive subject. Sensor-based detection means use, for example, optical sensors, infrared sensors, lasers sensor and so on, which each has an optical transmitter and an optical sensor matching thereto, for detecting whether the light beam(s) emitted by the optical transmitter is interfered, thereby determining whether there is human intrusion.

Among these known approaches, the most popular one is image detection for its advantages such as wide detection range, easy human recognition, and convenient recording documentation. The next-generation technology of image detection performs active detection by capturing dynamic motions in images and determining whether there is a human activity according to the variations or states of the images. While image detection does provide these benefits, it has areas to improve. For example, image detection tends to be limited by blind spots. If an activity is conducted outside a surveillance camera's field of vision, or if a surveillance camera is vandalized, the risk of unauthorized persons' intrusion through the blind spots increases. In this case, the surveillance camera performs practically no function. Another main defect is that installation of surveillance cameras costs a lot. A normal living house requires at least two to three surveillance cameras to cover its porch and vestibule. For a building or a large facility, deployment including tens or hundreds of cameras is not uncommon. Hence, the high installation costs do hinder deployment of surveillance cameras.

In consideration of their active ranges and costs, physical detection and optical detection are only used in areas that need protection most. Yet in practice these approaches are not difficult to break by, for example, non-physical intrusion, alternation of optical paths, and more possibilities. Thus, there is a need for a better scheme that provides improved detection efficiency and reduced risk of being cracked.

BRIEF SUMMARY OF THE INVENTION

The primary objective of the present invention is to address the problems of the conventional intrusion detection means related to low efficiency, easy cracked, and high deployment costs.

To solve the above issues, the objective of the present invention is to provide a SINR-based intrusion detection system, comprising a first antenna, a second antenna, and an arithmetic unit connected to the second antenna. The first antenna simultaneously transmits one or plural beams having mutually different frequencies in an enclosed space so as to cover the enclosed space. The second antenna receives signals of the one or plural beams so as to capture signal parameters of the beam. The arithmetic unit is connected to the second antenna and detects the signal parameters in an always-on manner so as to obtain a SINR value from the signal parameters, comparing the SINR value to a predetermined threshold range, and determining that there is object intrusion when the SINR value falls within the predetermined threshold range.

Further, the SINR value is determined using the following equation:

$$SINR = \frac{P}{I+N},$$

where P is the beam's power received by the second antenna; I is the interference power received by the second antenna; and N is the noise received by the second antenna.

Further, the arithmetic unit has a plurality of threshold ranges set therein, and determines the object in terms of size according to which threshold range the SINR value falls within.

Further, the arithmetic unit determines there is object intrusion, an alarm signal is generated and sent to a control center.

Further, the first antenna simultaneously transmits beams of different frequencies so as to cover dark-area distributive patterns in the enclosed space through the transmit beams of different frequencies.

Further, the SINR-based intrusion detection system comprises a plural of the first antenna and each of which simultaneously transmits beams of different frequencies so as to cover dark-area distributive patterns in the enclosed space through the transmit beams of different frequencies.

Another objective of the present invention is to provide a SINR-based intrusion detection system, comprising a transceiver antenna and an arithmetic unit connected to the transceiver antenna. The transceiver antenna simultaneously transmits one or plural beams having mutually different frequencies in an enclosed space so as to cover the enclosed space, and receiving returned signals of the one or plural beams in the enclosed space, so as to capture signal parameters of the beam. The arithmetic unit is connected to the transceiver antenna and detects the signal parameters in an always-on manner so as to obtain a SINR value from the signal parameters, comparing the SINR value to a predetermined threshold range, and determining that there is object intrusion when the SINR value falls within the predetermined threshold range.

Further, the SINR value is determined using the following equation:

$$SINR = \frac{P}{I+N},$$

where P is the beam's power received by the transceiver antenna; I is the interference power received by the transceiver antenna; and N is the noise received by the transceiver antenna.

Further, the arithmetic unit has a plurality of threshold ranges set therein, and determines the object in terms of size according to which threshold range the SINR value falls within.

Further, when the arithmetic unit determines there is object intrusion, an alarm signal is generated and sent to a control center.

Another objective of the present invention is to provides a SINR-based intrusion detection method, comprising steps of: simultaneously transmitting one or plural beams having mutually different frequencies in an enclosed space so as to cover the enclosed space; receiving signals of the one or plural beams, so as to capture signal parameters of the beam; detecting the signal parameters in an always-on manner so as to obtain a SINR value from the signal parameters; and comparing the SINR value to a predetermined threshold range, and determining there is object intrusion when the SINR value falls within the predetermined threshold range.

Further, the SINR value is determined using the following equation:

$$SINR = \frac{P}{I+N},$$

where P is power of the received beam; I is interference power of the received beam; and N is noise of the received beam.

Further, the SINR value is compared to plural predetermined threshold range, and determined the object in terms of size according to which threshold range the SINR value falls within.

Further, when the arithmetic unit determines there is object intrusion, an alarm signal is generated and sent to a control center.

Comparing to the conventional intrusion detection, the present invention has the following advantages:

1. As compared to the prior art, the disclosed intrusion detection technology requires lower setup costs, has more extensive working range, and detects human or object motion in the field range more effectively.

2. The present invention prevents formation of dark areas in the space to be monitored, so its working range is more extensive than that of the prior art, making it effective in monitoring signal variations in each area in the enclosed space, and preventing formation of blind spots in the enclosed space that are adverse to detection.

DETAILED DESCRIPTION OF THE INVENTION

The details and technical solution of the present invention are hereunder described with reference to accompanying drawings.

According to the present invention, an intrusion detection system 100 is configured to be deployed in an indoor enclosed space, such as in a living house, factory, office or other facilities, for which the present invention has no limitations. The intrusion detection system 100 distributes an electromagnetic field over the space, and uses power, interference, and noise received by an antenna to determine a SINR (Signal to Interference plus Noise Ratio) as a basis of determination of where there is human movement in the space. The disclosed intrusion detection system 100 may be linked to a server or a security center, which performs centralized access control.

Figure 1:
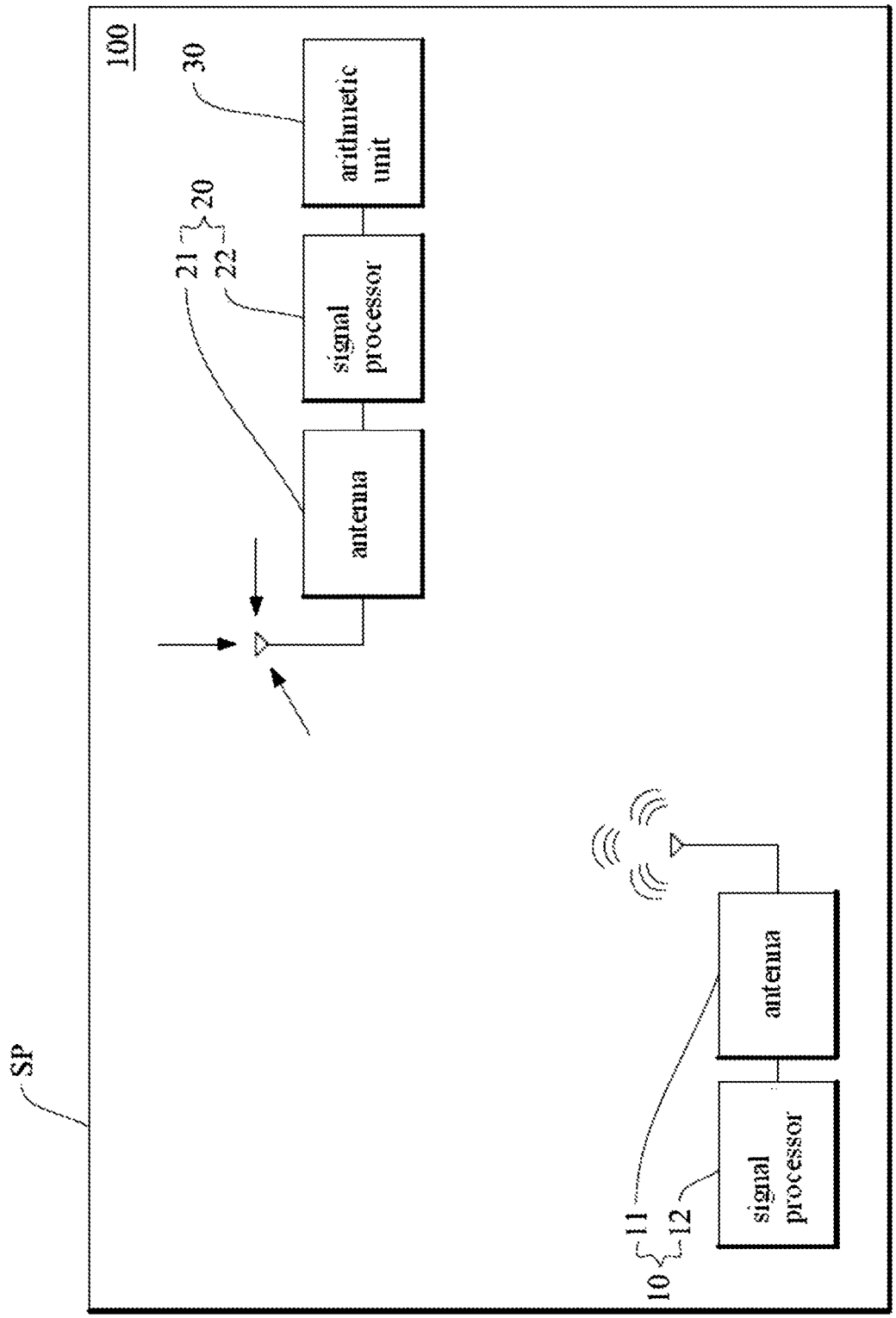
FIG. 1 is the block diagram of the first embodiment of the present invention.

Please refer to FIG. 1 for a block diagram of an intrusion detection system in an embodiment of the present invention.

As a preferred embodiment, the intrusion detection system 100 primarily comprises a first antenna 10, a second antenna 20, and an arithmetic unit 30 connected to the second antenna 20.

The first antenna 10 simultaneously transmits one or plural beams having mutually different frequencies in an enclosed space so as to cover the enclosed space SP. The first antenna 10 comprises an antenna 11, and a signal processor 12 linked to the antenna 11. The signal processor 12 provides the antenna 11 with a signal of a specific frequency so that the antenna 11 simultaneously transmits one or plural beams having different frequencies, wherein each of the frequencies occupies a unique channel. Since the channels are different from each other, different dark-area distributive patterns are formed in the space, thereby remedying problems related to an uneven dark-area distribution.

The second antenna 20 receives signals of the above one or plural beams, so as to capture signal parameters of the beams. Particularly, the second antenna 20 is linked to the arithmetic unit 30 and transmits the signal parameters it receives to the arithmetic unit 30 for analysis. The second antenna 20 comprises an antenna 21, and a signal processor 22 linked to the antenna 21. The signal processor 22 may be integrated with the arithmetic unit 30, for which the present invention places no limitations. The antenna 21 receives the signal parameters of the one or plural channels in the enclosed space SP, and transmits the signal parameters to the arithmetic unit 30.

The arithmetic unit 30 is connected to the second antenna 20 and detects the signal parameters in an-always-on manner so as to obtain a SINR value from the signal parameters. It then compares the SINR value to a predetermined threshold range. If the SINR value falls within the predetermined threshold range, it is determined that there is object intrusion.

The arithmetic unit 30 may be a central processing unit (CPU) or other programmable microprocessors. The arithmetic unit 30 may preferably work with a storage unit. In this case, the arithmetic unit 30 executes a program preloaded in the storage unit. The storage unit may be, for example, any types of fixed or mobile random access memories (RAMs), read-only memories (ROMs), flash memories, hard drives or the like or any combination thereof.

Figure 2:
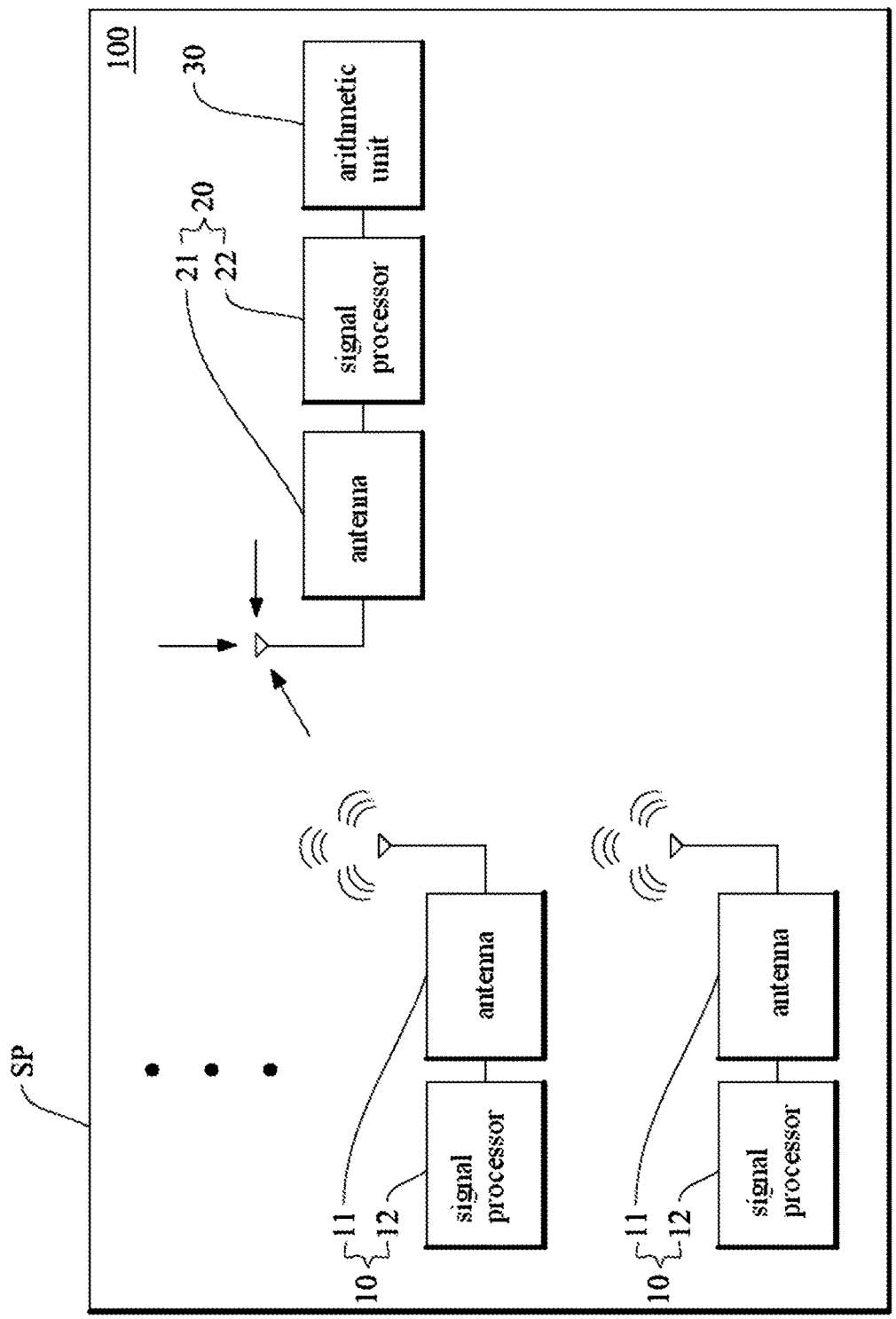
FIG. 2 is the block diagram of the second embodiment of the present invention.
Figure 3:
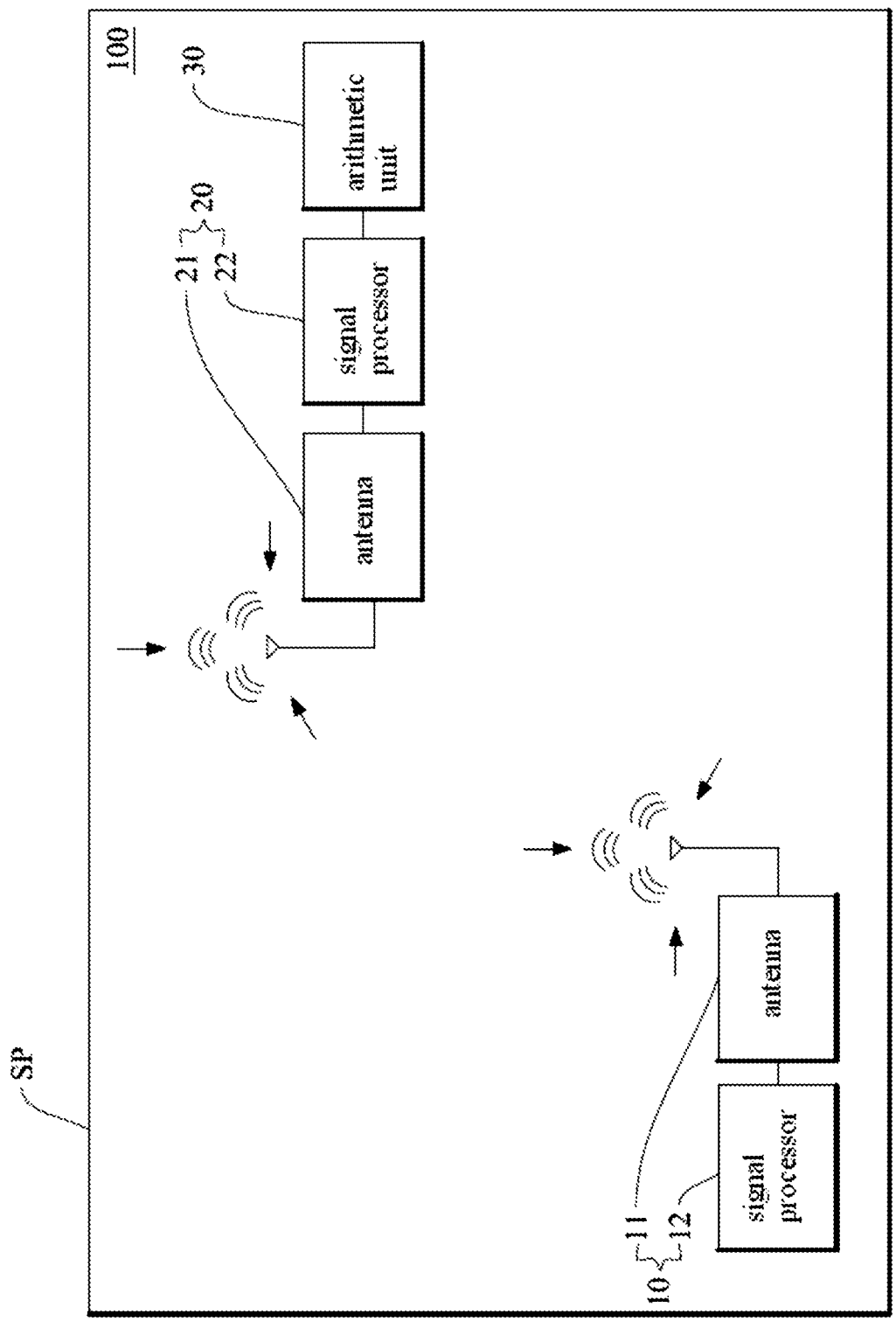
FIG. 3 is the block diagram of the third embodiment of the present invention.

In particular, the arithmetic unit 30 uses the second antenna 20 to detect the field in the space directly, so as to obtain signal parameters such as beam power, interference power, and noise, and then uses these signal parameters to obtain the SINR value, which will be described in detail later. In another preferred embodiment, the beams of plural different channels may be processed separately first. For example, a signal processing module first separates the signals of the channels, and gets signal parameters associated to each of the channels, respectively. Afterward, the signal processing module uses the signal parameters to calculate the SINR value of each channel. The signals of the plural different channels in the field are processed, and the SINR values of the different channels are monitored, respectively. In another preferred embodiment, as shown in FIG. 2, there may be plural said first antennas 10, each transmitting beams having different frequencies simultaneously. The beams of the different frequencies cover all the dark-area distributive patterns in the enclosed space SP. In another preferred embodiment, as shown in FIG. 3, the first antenna 10 and the second antenna 20, by means of frequency division duplexing (FDD), work both as the receiving end and the transmitting end. The resulting two-way detection further enhances the reliability of the intrusion detection system 100.

The SINR value is obtained using the equation below:

$$SINR = \frac{P}{I+N};$$

where, P is the beams' power received by the second antenna 20; I is the interference power received by the second antenna 20; and N is the noise received by the second antenna 20. Therein, one of P and I has its value obtained by the first antenna 10, for which the present invention places no limitations.

The equation above allows determination of the SINR value in accordance with the signal parameters in the field. The arithmetic unit 30 has a plurality of threshold ranges set therein, and determines the object in terms of size according to which threshold range the SINR value falls within. For example, for a static field where the SINR value is 0.8, the threshold range between 0.4 and 0.6 is set as a first reference threshold. When the SINR value falls within this interval, the incursive object may be a small-size one. In addition, the threshold range between 0.7 and 0.9 may be set as a second reference threshold. When the SINR value falls within this interval, the incursive object may be a large-size one. However, the foregoing numerical values may vary depending on the environment, or on the types of the transmitting antenna and receiving antenna. The foregoing values are exemplificative and not intended to limit the scope of the present invention.

When it is determined by the arithmetic unit 30 that there is object intrusion, an alarm signal is generated and sent to a server or a security system, so as to notify the security service staff or the user through his/her mobile device or other electronics connected to the Internet.

Figure 4:
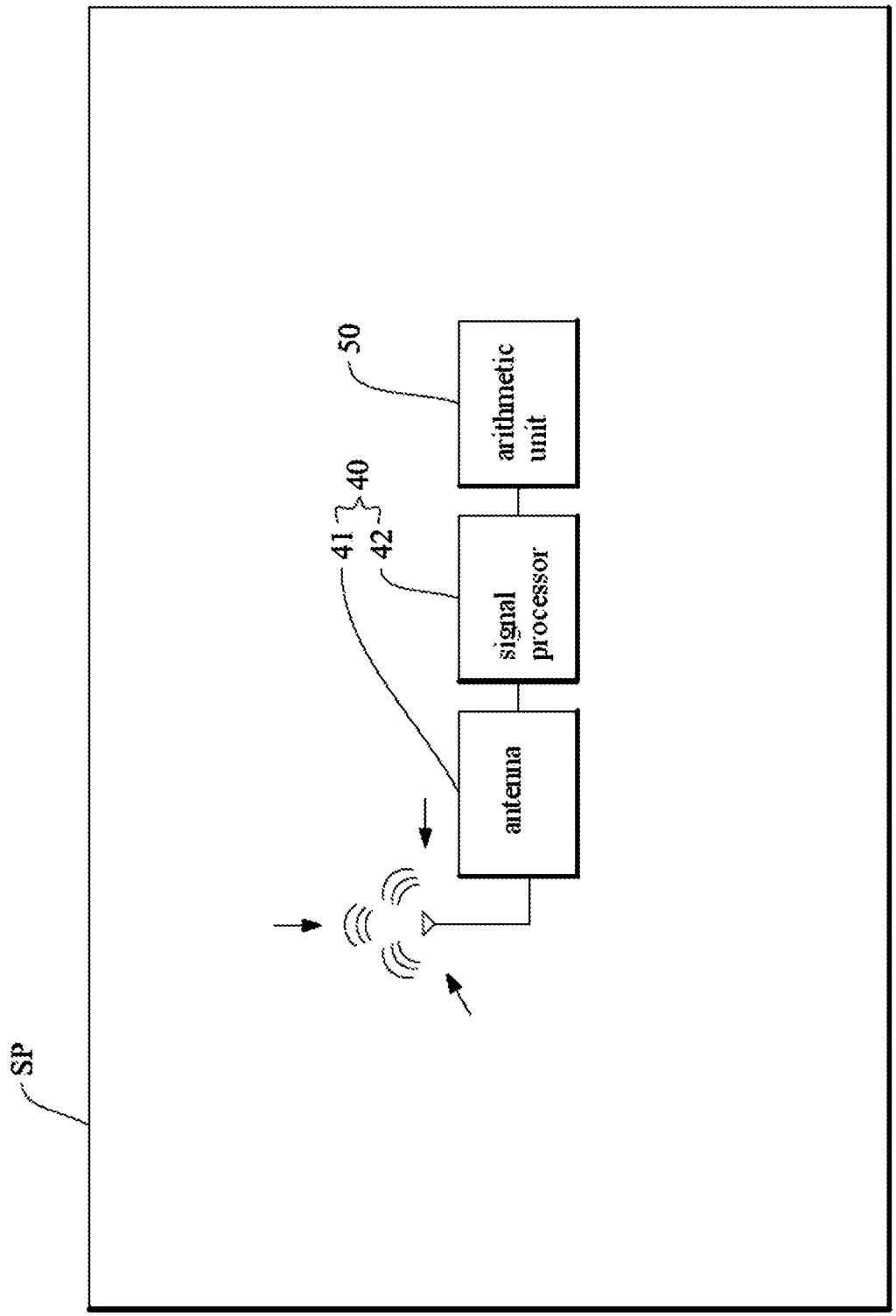
FIG. 4 is the block diagram of the forth embodiment of the present invention.

In another preferred embodiment, the intrusion detection system may use a single antenna to simultaneously perform signal transmission and reception, thereby achieving monitoring in the enclosed space. As shown in FIG. 4, the intrusion detection system comprises a transceiver antenna 40, and an arithmetic unit 50 connected to the transceiver antenna 40. The transceiver antenna 40 acts as both a signal transmitter and a signal receiver. The transceiver antenna 40 comprises an antenna 41, and a signal processor 42 linked to the antenna 41. The signal processor 42 may be integrated with the arithmetic unit 50, for which the present invention places no limitations. In particular, the transceiver antenna 40 simultaneously transmits one or plural beams having mutually different frequencies in an enclosed space SP so as to cover the enclosed space, and receives the returned signals of the one or plural beams in the enclosed space SP, thereby capturing the beams' signal parameters.

The arithmetic unit 50 is connected to the antenna 40 and detects the signal parameters in an always-on manner so as to obtain a SINR value from the signal parameters. It then compares the SINR value to a predetermined threshold range. When the SINR value falls within the predetermined threshold range, it is determined that there is object intrusion.

In the present embodiment, the SINR value is determined using the following equation:

$$SINR = \frac{P}{I+N},$$

where P is the beam's power received by the antenna; I is the interference power received by the antenna; and N is the noise received by the antenna.

The present embodiment uses a single transceiver antenna 40 to perform detection in an enclosed space, thereby reducing the amount of antennas required for the enclosed space.

Figure 5:
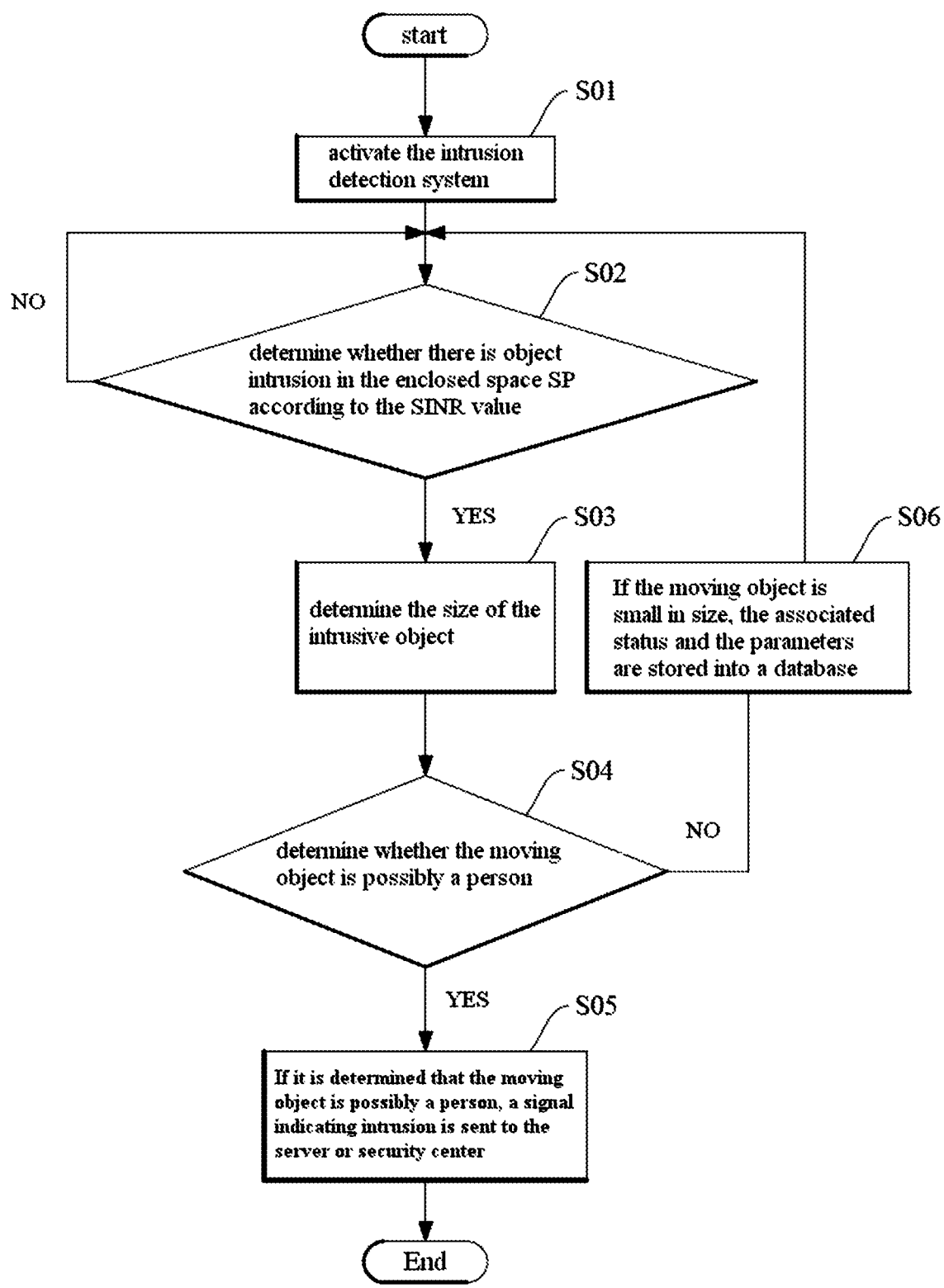
FIG. 5 is the flowchart I of preferred embodiment of the present invention.

The following description is directed to an intrusion detection method of the present invention according to one embodiment, and FIG. 5 is a flowchart of the disclosed intrusion detection method.

As a beginning, the intrusion detection system 100 is activated (Step S01). At this time, the system's arithmetic unit 30 monitors a SINR value in a real-time manner and determines whether there is object intrusion in the enclosed space SP according to the SINR value. (Step S02)

Where there is no human movement detected, the method repeats Step S02 at an interval that is set by the user. By increasing the intervals between two detection operations (or decreasing the detection frequency), the load to the system can be reduced.

Where there is human movement detected, the method performs Step S03, wherein the SINR value is compared to plural predetermined threshold ranges, and the threshold range in which the SINR value falls is used to determine the size of the intrusive object (Step S03). After the size of the object is determined, the size is used to determine whether the moving object is possibly a person (Step S04). If it is determined that the moving object is possibly a person, a signal indicating intrusion is sent to the server or security center (Step 505). If the moving object is small in size, the associated status and the parameters are stored into a database (Step S06), and the method returns to Step S02, where it continuously monitors the SINR value for continuous detection of object intrusion.

Figure 6:
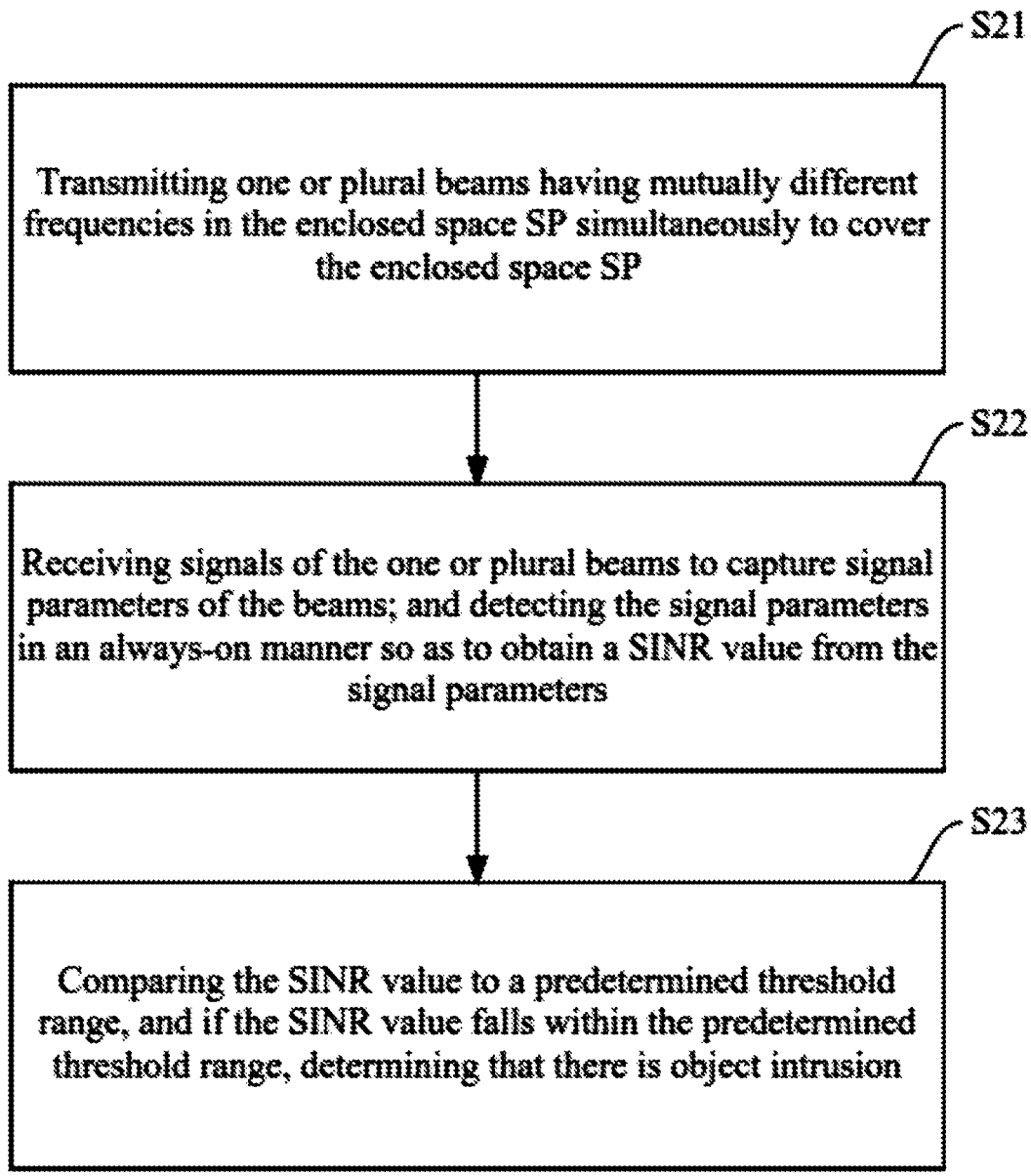
FIG. 6 is the flowchart II of preferred embodiment of the present invention.

Then, referring to FIG. 6, in Step S02, the intrusion detection method comprises the following steps:

transmitting one or plural beams having mutually different frequencies in the enclosed space SP simultaneously to cover the enclosed space SP; (Step S21)

receiving signals of the one or plural beams to capture signal parameters of the beams; and detecting the signal parameters in an always-on manner so as to obtain a SINR value from the signal parameters; (Step S22)

wherein the SINR value is obtained using the equation below:

$$SINR = \frac{P}{I+N},$$

where P is power of the received beams; I is interference power of the received beams; and N is noise of the receiving beams;

comparing the SINR value to a predetermined threshold range, and if the SINR value falls within the predetermined threshold range, determining that there is object intrusion (Step S23).

With the foregoing steps, the coverage against the field in the enclosed space can be significantly increased, thereby enhancing the reliability of the intrusion detection system.

To sum up, the present invention has its working range more extensive with lower setup costs as compared to the prior art, making it effective in monitoring human or object movements in an enclosed space. In addition, it prevents formation of dark area distribution. The present invention is effective in monitoring signal variations in each area in the enclosed space, and preventing formation of blind spots in the enclosed space that are adverse to detection.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claims and equivalents thereof.

What is claimed is:

1. A SINR-based intrusion detection system, comprising:
a first antenna, simultaneously transmitting one or plural electromagnetic wave beams having mutually different frequencies in an enclosed space so as to cover the enclosed space;
a second antenna, receiving signals of the one or plural electromagnetic wave beams so as to capture signal parameters of the one or plural electromagnetic wave beams; and
a processor, being connected to the second antenna, detecting the signal parameters in an always-on manner so as to obtain a SINR value from the signal parameters, comparing the SINR value to a predetermined threshold range, and determining that there is object intrusion when the SINR value falls within the predetermined threshold range, wherein the processor has a plurality of threshold ranges set therein, and determines the object in terms of size according to which threshold range the SINR value falls within.

2. The SINR-based intrusion detection system of claim 1, wherein the SINR value is determined using the following equation:

$$SINR = \frac{P}{I+N},$$

where P is the one or plural electromagnetic wave beam's power received by the second antenna; I is the interference power received by the second antenna; and N is the noise received by the second antenna.

3. The SINR-based intrusion detection system of claim 1, when the processor determines there is object intrusion, an alarm signal is generated and sent to a control center.

4. The SINR-based intrusion detection system of claim 1, wherein the first antenna simultaneously transmits beams of different frequencies so as to cover dark-area distributive patterns in the enclosed space through the transmit beams of different frequencies.

5. The SINR-based intrusion detection system of claim 1, further comprising a plurality of the first antennas, and each of which simultaneously transmits beams of different frequencies so as to cover dark-area distributive patterns in the enclosed space through the transmit beams of different frequencies.

6. A SINR-based intrusion detection system, comprising:
a transceiver antenna, simultaneously transmitting one or plural electromagnetic wave beams having mutually different frequencies in an enclosed space so as to cover the enclosed space, and receiving returned signals of the one or plural electromagnetic wave beams in the enclosed space, so as to capture signal parameters of the one or plural electromagnetic wave beams; and
a processor, being connected to the transceiver antenna, detecting the signal parameters in an always-on manner so as to obtain a SINR value from the signal parameters, comparing the SINR value to a predetermined threshold range, and determining there is object intrusion when the SINR value falls within the predetermined threshold range, wherein the processor has a plurality of threshold ranges set therein, and determines the object in terms of size according to which threshold range the SINR value falls within.

7. The SINR-based intrusion detection system of claim 6, wherein the SINR value is determined using the following equation:

$$SINR = \frac{P}{I+N},$$

where P is the one or plural electromagnetic wave beam's power received by the transceiver antenna; I is the interference power received by the transceiver antenna; and N is the noise received by the transceiver antenna.

8. The SINR-based intrusion detection system of claim 6, when the processor determines there is object intrusion, an alarm signal is generated and sent to a control center.

9. A SINR-based intrusion detection method, comprising steps of:
simultaneously transmitting one or plural electromagnetic wave beams having mutually different frequencies in an enclosed space so as to cover the enclosed space;
receiving signals of the one or plural electromagnetic wave beams, so as to capture signal parameters of the one or plural electromagnetic wave beams;
detecting the signal parameters in an always-on manner so as to obtain a SINR value from the signal parameters; and
comparing the SINR value to a predetermined threshold range, and determining there is object intrusion when the SINR value falls within the predetermined threshold range;
the SINR value is compared to plural predetermined threshold ranges, and determining the object in terms of size according to which threshold range the SINR value falls within.

10. The SINR-based intrusion detection method of claim 9, wherein the SINR value is determined using the following equation:

$$SINR = \frac{P}{I+N},$$

where P is the power received from the one or plural electromagnetic wave beams; I is the interference power received from the one or plural electromagnetic wave beams; and N is the noise of one or plural electromagnetic wave beams.

11. The SINR-based intrusion detection method of claim 9, when a processor determines there is object intrusion, an alarm signal is generated and sent to a control center.

\* \* \* \* \*